United States Patent [19]

Morimoto

[11] 4,087,116
[45] May 2, 1978

[54] DRIVE AXLE SUSPENSION SYSTEM IN MOTOR VEHICLE
[75] Inventor: Yoshio Morimoto, Hiroshima, Japan
[73] Assignee: Toyo Kogyo Co., Ltd., Japan
[21] Appl. No.: 712,069
[22] Filed: Aug. 5, 1976
[30] Foreign Application Priority Data
Aug. 15, 1975 Japan .................................. 50-99673
[51] Int. Cl.² ............................................ B60G 11/14
[52] U.S. Cl. .................................................. 280/724
[58] Field of Search ................ 280/724, 725, 726, 688
[56] References Cited
U.S. PATENT DOCUMENTS

| | | | |
|---|---|---|---|
| 3,193,302 | 7/1965 | Hill | 280/724 |
| 3,459,436 | 8/1969 | Rusconi | 280/724 |
| 3,583,725 | 6/1971 | Fry | 280/724 |

Primary Examiner—Richard A. Bertsch
Attorney, Agent, or Firm—Wenderoth, Lind & Ponack

[57] ABSTRACT

A drive axle suspension system includes a rigid drive axle and a housing therefor, an upper pair of links pivotally coupled at their front ends to the vehicle body and at their rear ends to opposed end portions of the housing, and a lower pair of links pivotally coupled at their front ends to the vehicle body and at their rear ends to opposed end portions of the housing. The angle through which either one of the upper links or one of the lower links is pivotally connected between the associated end portions of the housing and the vehicle body is made different from the angle through which either the other of the upper links or the other of the lower links is pivotally connected between the associated end portions of the housing and the vehicle body.

3 Claims, 8 Drawing Figures

Number of Repeated Accel. and Decel.

Number of Repeated Accel. and Decel.

Number of Repeated Accel. and Decel.

Number of Repeated Accel. and Decel.

DRIVE AXLE SUSPENSION SYSTEM IN MOTOR VEHICLE

BACKGROUND OF THE INVENTION

The present invention relates to a drive axle suspension system in a motor vehicle.

It has often been experienced that, upon variation in power output torque of a vehicle engine resulting from depression of an acceleration pedal, a vibrating system comprising an inertia of an engine flywheel, a relative twisting rigidity and damped oscillation of the suspension system including a drive system and wheels, and the mass of the vehicle, tends to be oscillated with consequent forward and backward oscillation occurring in the vehicle. Particularly in the case where a motor vehicle has a rear drive axle suspension system of the four-link suspension type with or without a Panhard rod in combination with radial-ply tires mounted on the wheels, attenuation of the vibrating system is so small that, upon sudden variation in the engine power output torque, uncomfortable and undesirable forward and backward oscillation tends to be prolonged.

In order to substantially avoid or minimize such forward and backward oscillation, it has heretofore been proposed to provide a hydraulic coupling in the vibrating system of the motor vehicle for taking the variation of the engine power output torque effectively. However, it has been found that the hydraulic coupling itself is expensive and, therefore, tends to increase the cost of manufacturing the motor vehicle.

The U.S. Pat. No. 3,444,947, patented on May 20, 1969, discloses a drive axle suspension system wherein resilient snubbers are used to resiliently resist wind-up of a drive axle housing induced by acceleration of the vehicle, which wind-up involves an unacceptably large upward movement of the drive shaft and differential housing. Although the purpose of the invention of the above described U.S. Patent is quite different from that of the present invention, the concept of the present invention can equally be applicable to the drive axle suspension system disclosed in the above described U.S. Patent.

SUMMARY OF THE INVENTION

The object of the present invention is to prevent the undesirable forward and backward oscillation of the vehicle during acceleration or deceleration, without the employment of any complicated preventive means for that purpose, but merely by improving the existing link mechanism of the suspension system, thereby ensuring a stabilized steering performance.

According to the present invention, the drive axle suspension system generally comprises an upper pair of generally longitudinally extending pivotal links, which are pivotally connected at their front ends to the vehicle body and at their rear ends to axle casings forming the axle housing together with a differential gear casing, and a lower pair of generally longitudinally extending pivotal links which are pivotally connected at their front ends to the vehicle body and at their rear ends to the axle casings. A left-hand set of one of the upper pivotal links and the adjacent lower pivotal link and a right-hand set of the other of the upper pivotal links and the adjacent lower pivotal link are so arranged in asymmetrical relation to each other with respect to the center line of the vehicle that components of the force induced by variation of the engine output torque upon acceleration or deceleration, which components respectively act on left-hand and right-hand rear wheels in a direction perpendicular to the ground surface, can be differentiated from each other to cause the vehicle to undergo a rolling and pitching motion necessary to cancel the force induced by acceleration or deceleration of the vehicle. In this way, the possibility of the undesirable forward and backward oscillation of the vehicle can substantially be avoided.

There is an additional advantage resulting from the invention. As is well known to those skilled in the art, when the drive shaft is rotated counterclockwise as viewed from the rear, an understeer is more considerable during a right turn maneuver of the vehicle than during the left turn maneuver of a same, thus giving a difference in steerability between the left and right turn maneuvers. This difference in steerability can, according to the present invention, substantially be eliminated to facilitate a stabilized drive of the vehicle because of the asymmetrical arrangement of the pivotal links.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
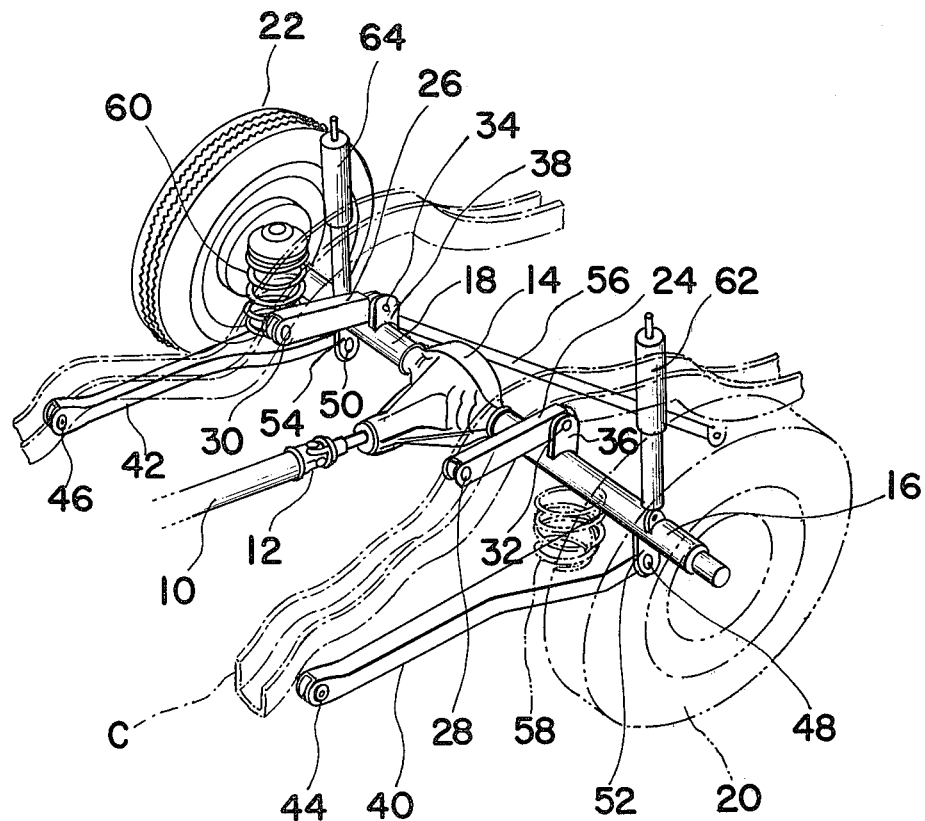
FIG. 1 is a schematic perspective view of a drive axle suspension system in a motor vehicle, which embodies the present invention.

Referring first to FIG. 1, a rear end portion 10 of a drive shaft 10 is pivotally connected by means of a universal joint 12 to an input pinion shaft of a differential gear mechanism (not shown) contained within a differential casing 14 forming a part of a rear drive axle housing. The rear drive axle housing further includes a pair of opposed tubular axle casings 16 and 18 which project from the differential casing 14 and contain drive shafts for left-hand and right-hand rear wheels 20 and 22 of a motor vehicle.

A four-link suspension includes an upper pair of generally longitudinally extending pivotal links 24 and 26, which are pivotally connected at their front ends to the vehicle body, for example, a chassis of the vehicle shown by the phantom line and generally indicated by C, by respective pivots 28 and 30 disposed on a common transverse support member (not shown) extending between a pair of opposed chassis frames, the rear ends of the links 24 and 26 being pivotally connected by respective pivots 32 and 34 to brackets 36 and 38 which are fixedly secured to the respective axle casings 16 and 18.

The four-link suspension also includes a lower pair of generally longitudinally extending pivotal links 40 and 42, which are pivotally connected at their front ends to the chassis frames of the vehicle by means of respective pivots 44 and 46 disposed on a common transverse member which is further forward than the common transverse member for the links 24 and 26. The rear ends of the lower links 40 and 42 are pivotally connected by means of pivots 48 and 50 to brackets 52 and 54 which are fixedly secured to the respective axle casings 16 and 18. The pivots 48 and 50 are disposed at positions generally below the axle casings 16 and 18.

The illustrated suspension system is shown to have a transversely extending guide link 56, which is generally referred to as a Panhard rod and which has one end pivotally connected to the chassis C on the right-hand side of the center line of the vehicle and the other end pivotally connected to the left-hand axle casing 16.

A pair of helical compression springs 58 and 60 are respectively interposed between the vehicle body and the lower links 40 and 42. Respective shock absorbers 62 and 64 are pivotally connected between the vehicle body and the axle casings 16 and 18.

The construction so far described is well known to those skilled in the art. However, it is to be noted that the concept of the present invention can equally be applicable to a suspension system wherein no Panhard rod 56 is employed.

Figure 2:
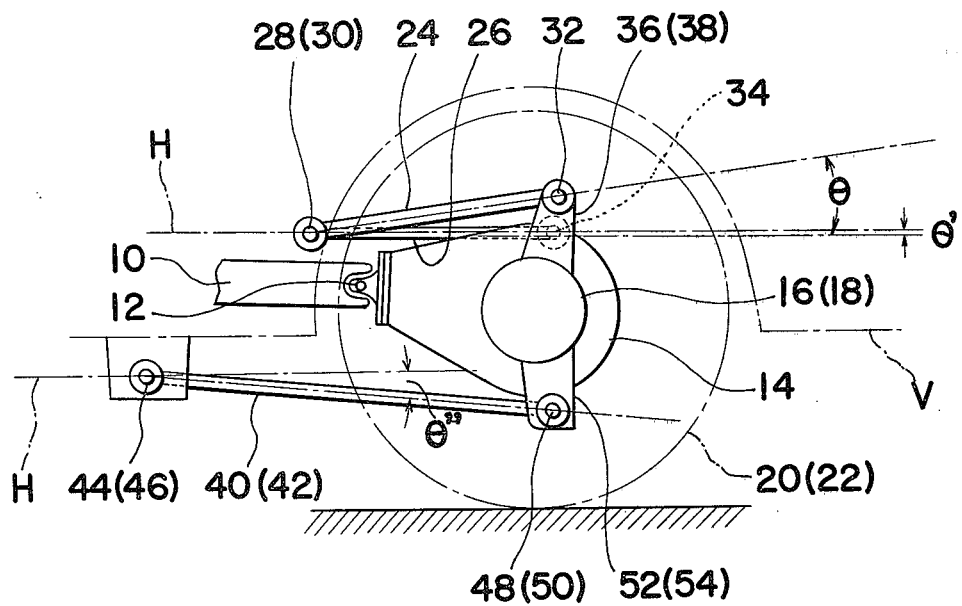
FIG. 2 is a side elevational view of the suspension system shown in FIG. 1.

In accordance with the teachings of the present invention, as can readily be seen from FIG 2, the right-hand pivot 34 is positioned at a position lower than the position of the left-hand pivot 32. Specifically, the height of the pivot 34 above the axle casing 18 is smaller than the height of the pivot 32 above the axle casing 16 by, for example, 30 mm. This is applicable where the drive shaft 10 is rotated counterclockwise as viewed from the rear of the vehicle during forward drive of the vehicle.

The reason that the asymmetrical arrangement of the suspension links according to the present invention can substantially eliminate the undesirable forward and backward oscillation of the vehicle occurring upon variation in the engine output torque will now be described with particular reference to FIG. 2.

Figure 3:
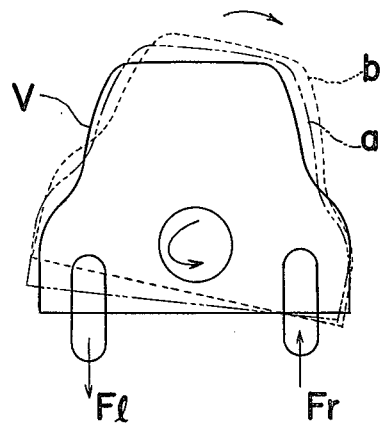
FIG. 3 is a schematic rear elevational view of a motor vehicle illustrating how the vehicle tilts in relation to the direction of rotation of a drive shaft.

Referring to FIG. 2, it will readily be seen that the asymmetrical arrangement of the suspension links is such that the angle $\theta'$ defined between the horizontal datum shown by the chain line H and the imaginary line passing concurrently through the pivots 30 and 34 of the right-hand pivotal link 26 is made smaller than the angle $\theta$ defined between the horizontal datum H and the imaginary line passing concurrently through the pivots 28 and 32 of the left-hand pivotal link 24 while the angles $\theta''$ respectively defined between the horizontal datum H and the imaginary lines respectively passing through the pivots 44 and 48 and the pivots 46 and 50 remain the same and are selected in consideration of the angles $\theta$ and $\theta'$, whereby upwardly and downwardly acting components of the driving force induced by variation of the engine output torque, which components are respectively imposed on the left-hand and right-hand wheels 20 and 22 through the left-hand and right-hand sets of upper and lower links 24 and 40, 26 and 42, respectively, can act on the left-hand wheel 20 in a downward direction and on the right-hand wheel 22 in an upward direction, respectively, as shown in FIG. 3.

Therefore, when variation of the power output torque occurs in the engine rotating counterclockwise as viewed from the rear of the vehicle, the vehicle body V is forced to tilt in a direction counter to the direction of rotation of the engine to a position as indicated by a in FIG. 3 during acceleration or deceleration in reaction to the variation of the engine power output torque, the tilting motion of the vehicle body V being further facilitated to a position shown by b in FIG. 3 as a result of a counter-force opposed to the component of force Fl, downwardly acting on the left-hand wheel 20, and also to the component of force Fr upwardly acting on the right-hand wheel 22.

In view of the foregoing, the vehicle undergoes rolling and pitching motions so considerably that the force necessary to cancel the force prevalent at a driver's seat induced upon acceleration or deceleration of the engine becomes great and, as a result thereof, the forward and backward oscillation of the vehicle during acceleration or deceleration can effectively be minimized or substantially eliminated.

According to a series of experiments conducted by the inventor, it has been found that the forward and backward acceleration of the seat back relative to the occupant on such seat can advantageously be relieved more effectively with the asymmetrical arrangement of the four-link suspension than the conventional arrangement wherein the left-hand and right-hand sets of the upper and lower pivotal links are arranged in symmetrical relation to each other. This will now be described with particular reference to FIGS. 4 to 8.

Figure 4:
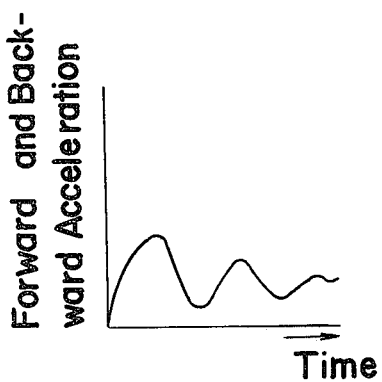
FIG. 4 is a graph illustrating variation of the forward and backward acceleration occurring when the acceleration pedal has been fully been depressed with the engine operated at a predetermined number of revolutions and a gear change lever set at a predetermined position.

FIG. 4 illustrates a graph wherein the ordinate represents variation in forward and backward acceleration occurring at the time the acceleration pedal has fully been depressed while the number of engine revolutions and the transmission are respectively set to a predetermined value and a predetermined position, the abscissa representing the time elapsed. FIGS. 5 to 8 illustrate respective graphs wherein the ordinates represent the amplitude of the forward and backward acceleration shown in FIG. 4 while the abscissas represent the number of occurrences of such forward and backward acceleration. It is to be noted that, in each of FIGS. 5 to 8, the smaller value represents the smaller amplitude of the forward and backward oscillation and the smaller value at the smaller number of occurrences of the forward and backward acceleration accounts for the fact that the attenuation is high.

Figure 5:
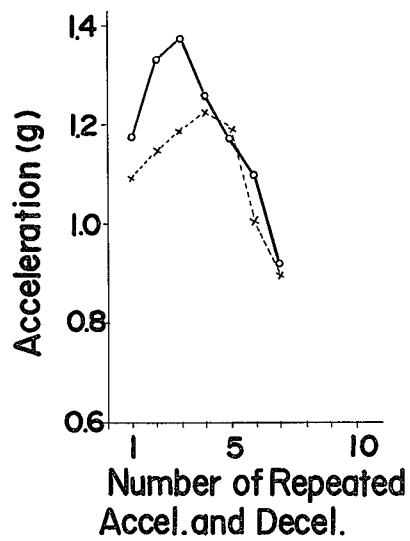
FIGS. 5 to 8 are graphs illustrating performance characteristics of the suspension system according to the present invention in comparison with those of the conventional suspension system.
Figure 6:
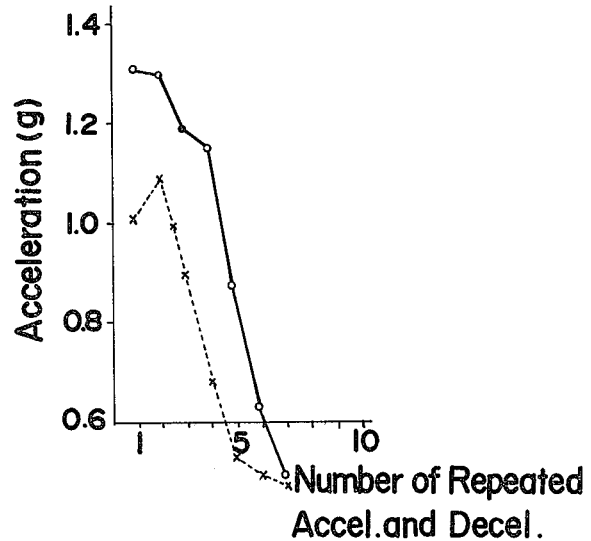

More specifically, the graphs of FIGS. 5 and 6 illustrate the individual performance characteristics obtained by repreated acceleration and deceleration when the engine is rotated at 1,200 rpm with the transmission set to the second and third positions, respectively. The graphs of FIGS. 7 and 8 illustrate the individual performance characteristics obtained by repeated acceleration and deceleration when the engine is rotated at 1,500 rpm with the transmission set to the second and third positions, respectively.

From the graphs of FIGS. 5 to 8, it is clear that, as compared with the forward and backward acceleration on the seat back, as shown by the solid line, with the conventional suspension system wherein the left-hand and right-hand sets of the upper and lower pivotal links are arranged in symmetrical relation to each other, the forward and backward acceleration on the seat back, as shown by the broken line, with the suspension system according to the present invention wherein the height of the pivot 34 above the axle casing 18 is 30 mm. smaller than that of the pivot 32 above the axle casing 16 is small as a whole.

Figure 7:
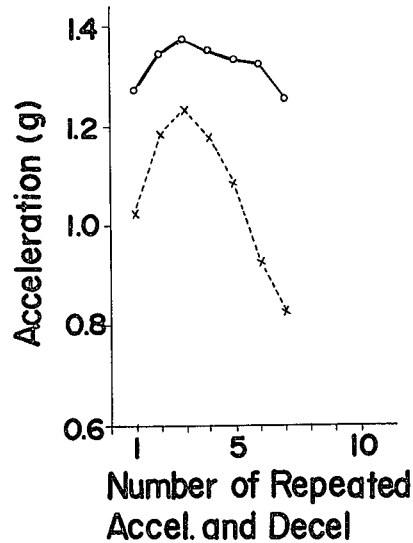
Figure 8:
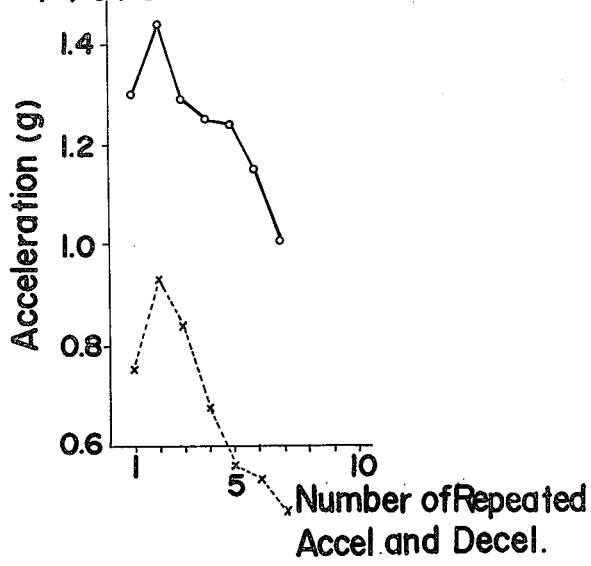

It is also clear that, from the comparison of the graphs of FIGS. 6 and 8 with that of FIGS. 5 and 7, the forward and backward acceleration on the seat back can be reduced more effectively when the transmission is set to the third position than when the transmission is set to the second position and that, from the graphs of FIGS. 5 to 8, the forward and backward acceleration can be reduced more effectively when the engine rotational speed is high at the time of start of acceleration than when the engine rotational speed is low at the same time.

In the illustrated embodiment, since the rear drive axle suspension system is so designed that the direction of rolling motion of the vehicle defined by the asymmetrical arrangement of the pivotal links according to the present invention can coincide with the direction of rolling motion of the same vehicle defined by the reactive force opposite to the driving torque, the force necessary to cancel the force which generates the forward and backward oscillation becomes great and acts effectively.

Although in the illustrated embodiment the angle at which the upper pivotal link 24 is pivotally coupled to the bracket 36 through the pivot 32 and the angle at which the upper pivotal link 26 is pivotally coupled to the bracket 38 through the pivot 34 have been described as different from each other, that is, the angle $\theta$ is made greater than the angle $\theta'$, the same objective can also be achieved if the angle at which the lower pivotal link 40 is pivotally coupled to the bracket 52 through the pivot 48 is made different from the angle at which the lower pivotal link 42 is pivotally coupled to the bracket 54 through the pivot 50, or the combination of the left-hand set of the upper and lower pivotal links may be differentiated from the combination of the right-hand set of the upper and lower pivotal links. In any event, it will suffice if the position of the left-hand set of the upper and lower links is so determined relative to the position of the right-hand set of the upper and lower links, and vice versa, that the rolling motion of the vehicle attributable to the reactive force counter-acting to the variation in the engine power output torque can be facilitated.

Where the left-hand and right-hand sets of the upper and lower pivotal links are to be arranged in asymmetrical relation to each other, this can be achieved by displacing the position, at which any one of the upper and lower pivotal links of either of the left-hand and right-hand sets is pivotally coupled to the axle casing through the associated bracket, relative to the position at which any one of the upper and lower pivotal links of the other of the left-hand and right-hand sets is pivotally coupled to the axle casing through the associated bracket, or by displacing the position, at which any one of the upper and lower pivotal links of either of the left-hand and right-hand sets is pivotally coupled to the vehicle body through the associated bracket, relative to the position at which any one of the upper and lower pivotal links of the other of the left-hand and right-hand sets is pivotally coupled to the vehicle body through the associated bracket.

However, displacement of one of the left-hand and right-hand upper links relative to the other of the left-hand and right-hand upper links can be achieved more readily and effectively than that of one of the left-hand and right-hand lower links relative to the other of the left-hand and right-hand lower links.

It is to be noted that, since the asymmetrical arrangement of the left-hand and right-hand sets of the upper and lower pivotal links considerably affects the steerability of the vehicle during turn thereof to the left or right, the design thereof is naturally limited for the purpose of ensuring safe driving of the vehicle. In view of this, the design of the asymmetrical arrangement should be determined such that any possible reduction in steerability can be neglected as minimal. In the present invention, the difference of about 30 mm. is considered to be sufficient between the height of the pivot through which one of the upper links is pivotally coupled to the associated bracket on the axle casing and the height of the pivot through which the other of the upper links is pivotally coupled to the associated bracket on the axle casing. In other words, the difference between the height of the pivot through which one of the upper links is pivotally coupled to the associated bracket on the axle casing and the height of the pivot through which the other of the upper links is pivotally coupled to the associated bracket on the axle casing is so selected that, when it is assumed that the driving force acting on the ground surface through the wheels is of a value 1 (one), the difference in amount between the component of the force acting on one of the left-hand and right-hand drive wheels and that acting on the other of the left-hand and right-hand drive wheels can be about 0.32.

In practice, the above described difference in amount of the downwardly and upwardly acting components of the force may vary depending upon, and therefore is selected in consideration of, the length of the upper and lower pivotal links, the angles at which the upper or lower pivotal link is connected to the axle casing and/or the distance between the center of the wheels and the pivot through which the upper or lower pivotal link is connected to the associated axle casing.

With the conventional suspension system, it has been well known that understeer is predominant during the right turn of the vehicle as compared with that during the left turn where the drive shaft is rotated counterclockwise as viewed from the rear of the vehicle. However, according to the present invention, since the left-hand and right-hand sets of the upper and lower pivotal links are arranged in asymmetrical relation to each other as hereinbefore described, the tendency of understeer during the right turn of the vehicle can advantageously be reduced, thereby substantially eliminating any possible difference in steerability of the vehicle which may otherwise be present between the time, when the vehicle is steered to the right-hand direction, and the time when the same is steered to the left-hand direction. In other words, with the asymmetrical arrangement of the suspension system according to the present invention, a steady steerability can be appreciated.

It is well recognized that some motor vehicles, of which the drive shafts are rotated counterclockwise as viewed from the rear thereof, tend to exhibit less understeerability during the right turn than during the left turn because of the employment of the Panhard rod and/or the distribution of loads imposed on their rear drive wheels. Where the concept of the present invention is to be applied to those motor vehicles, it is feasible to lower the position of the pivot, through which the right-hand upper link is pivotally coupled to the right-hand axle casing through the bracket, relative to the position of the pivot through which the left-hand upper link is pivotally coupled to the left-hand axle casing through the bracket, such as shown in FIG. 2, where the prevention of the forward and backward oscillation of the vehicle is considered of great importance, or to lift the position of the first mentioned pivot relative to the position of the second mentioned pivot in a manner contrary to that shown in FIG. 2 where the balanced steerability is desired during any of the right and left turns of the vehicle while the occurrence of the forward and backward oscillation can be neglected.

In view of the foregoing, in the present invention, the left-hand and right-hand sets of the upper and lower links are arranged in asymmetrical relation to each other in consideration of both the prevention of the forward and backward oscillation of the vehicle and the balanced steerability of the vehicle.

As hereinbefore fully described, since the asymmetrical arrangement of the pivotal links is such that the downwardly and upwardly oriented forces can respectively act on the left-hand and right-hand rear wheels where the drive shaft is rotated counterclockwise as viewed from the rear of the vehicle or on the right-hand and left-hand rear wheels where the drive shaft is rotated clockwise as viewed from the rear of the vehicle, the undesirable forward and backward oscillation which tends to occur upon and during acceleration or deceleration of the engine can advantageously be reduced with no special preventive device or means required. Moreover, the concept of the present invention can be applied to the conventional drive axle suspension system of a type with or without the Panhard rod at a reasonably inexpensive cost and with a slight modification or machining.

Although the present invention has fully been described in conjunction with the preferred embodiment thereof with reference to the accompanying drawings, it is to be noted that, in addition to the possible changes and modifications which have been described above, other changes and modifications will be apparent to those skilled in the art. Such changes and modifications are to be understood as included within the true scope of the present invention unless they depart therefrom.

I claim:

1. A drive axle suspension system for a motor vehicle, said system comprising a rigid drive axle, a housing for the rigid drive axle, an upper pair of generally longitudinally extending links pivotally connected at front ends thereof to a vehicle body and at rear ends thereof to opposed end portions of said housing, and a lower pair of generally longitudinally extending links pivotally connected at front ends thereof to the vehicle body and at rear ends thereof to opposed end portions of the housing at positions generally angularly spaced from the positions where said rear ends of said upper links are pivotally connected to the first mentioned opposed end portions of said housing, respectively, each of said links being positioned to define an angle with the horizontal datum, the angle of one link in at least one of said pairs of links being differentiated from the angle of the other link of said pair.

2. A drive axle suspension system as claimed in claim 1, wherein the position of the pivot through which the rear end of one of said upper links is pivotally coupled to an associated one of the first mentioned opposed end portions of the housing is differentiated from the position of the pivot through which the rear end of the other of said upper links is pivotally coupled to the other of the first mentioned opposed end portions of the housing, in a direction perpendicular to the horizontal datum.

3. A drive axle suspension system as claimed in claim 2, wherein the difference in position between the first and second mentioned pivots is approximately 30 mm.

* * * * *